United States Patent

Schmidt et al.

[15] 3,691,159
[45] Sept. 12, 1972

[54] TRICYCLIC HETEROCYCLIC AMIDES OF DIALLYLAMINO-ALKANOIC ACIDS AND SALTS THEREOF

[72] Inventors: Günther Schmidt, Joh.-Seb.-Bach-Strasse 27; Robert Engelhorn, Talfeldstrasse 45; Mátyás Leitold, Mozartstrasse 22, all of 795 Biberach/Riss, Germany

[22] Filed: July 13, 1970

[21] Appl. No.: 54,624

[30] Foreign Application Priority Data
July 18, 1969  Germany........P 19 36 670.2

[52] U.S. Cl............260/239.3 T, 424/244, 424/263, 424/253
[51] Int. Cl..............................................C07d 53/02
[58] Field of Search....................260/239.3 T

[56] References Cited

UNITED STATES PATENTS

| | | |
|---|---|---|
| 3,316,249 | 4/1967 | Hanze.................260/239.3 T |
| 3,316,251 | 4/1967 | Schmidt et al. .....260/239.3 T |
| 3,326,900 | 6/1967 | Schmidt et al. .....260/239.3 T |
| 3,406,168 | 10/1968 | Schmidt et al. .....260/239.3 T |
| 3,419,547 | 12/1968 | Schmutz et al......260/239.3 T |
| 3,539,554 | 11/1970 | Schmidt et al. .....260/239.3 T |

FOREIGN PATENTS OR APPLICATIONS 1,505,795  11/1967  France................260/239.3 T

OTHER PUBLICATIONS

Monro et al., J. Med. Chem., Vol. 6, pages 255– 261 (1963)

Primary Examiner—Henry R. Jiles
Assistant Examiner—Robert T. Bond
Attorney—Hammond & Littell

[57] ABSTRACT

Compounds of the formula

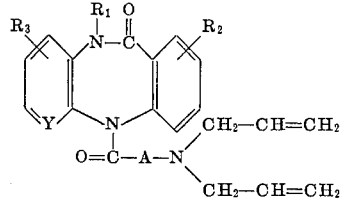

wherein
$R_1$ is hydrogen or alkyl of one to four carbon atoms,
$R_2$ and $R_3$ are each hydrogen or halogen,
Y is nitrogen or —CH—, and
A is alkylene of one to two carbon atoms,
and their non-toxic, pharmacologically acceptable acid addition salts; the compounds as well as their salts are useful as ulcer inhibitors and stomach juice secretion inhibitors in warm-blooded animals.

12 Claims, No Drawings

TRICYCLIC HETEROCYCLIC AMIDES OF DIALLYLAMINO-ALKANOIC ACIDS AND SALTS THEREOF

This invention relates to novel tricyclic heterocyclic amides of diallylamino-alkanoic acids and non-toxic, pharmacologically acceptable acid addition salts thereof, as well as to a method of preparing these compounds.

More particularly, the present invention relates to tricyclic heterocyclic amides of diallylamino-alkanoic acids of the formula

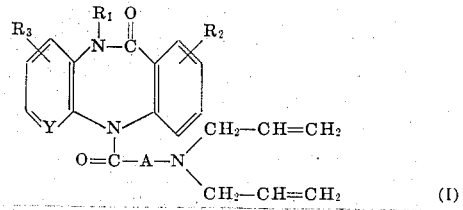

wherein
$R_1$ is hydrogen or alkyl of one to four carbon atoms,
$R_2$ and $R_3$, which may be identical to or different from each other, are each hydrogen or halogen,
Y is nitrogen or —CH—, and
A is straight or branched alkylene of one to two carbon atoms,
and non-toxic, pharmacologically acceptable acid addition salts thereof.

The compounds of the formula I are prepared by reacting a tricyclic heterocyclic amide of a halo-alkanoic acid of the formula

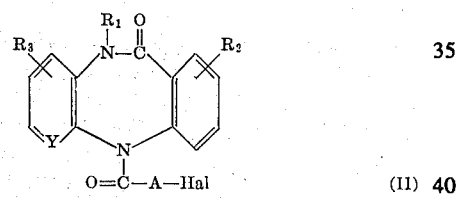

wherein $R_1$, $R_2$, $R_3$, A and Y have the same meanings as in formula I and Hal is halogen, with diallylamine.

The reaction is advantageously carried out in the presence of an inert organic solvent and optionally in the presence of an acid-binding agent, at elevated temperatures, preferably at the boiling point of the solvent. Examples of suitable solvents are ethanol, isopropanol, acetone, dioxane and aromatic hydrocarbons, such as benzene or toluene. Examples of suitable acid-binding agents are alkali metal carbonates and alkali metal bicarbonates; however, if the diallylamine reactant is provided in sufficient excess over the stoichiometrically required amount, the excess may itself serve as the acid-binding agent to tie up or neutralize the hydrogen halide released by the reaction. In some instances the reaction is advantageously carried out in a closed vessel.

The compounds of the formula I are organic bases and therefore form acid addition salts with inorganic or organic acids. Examples of non-toxic, pharmacologically acceptable acid addition salts are those formed with hydrochloric acid, hydrobromic acid, sulfuric acid, phosphoric acid, tartaric acid, fumaric acid, citric acid, maleic acid, succinic acid, oxalic acid, 8-chlorotheophylline or the like. Such non-toxic acid addition salts are prepared by conventional methods, such as by dissolving the free base in a suitable solvent and acidifying the solution with the desired inorganic or organic acid.

The starting compounds of the formula II are either described in the literature or may be prepared by methods analogous to those described in the literature [see, for example, A. M. Monro et al.; J. Med. Chem. 6, 255 (1963)]. Thus, a compound of the formula II may be prepared by reacting a tricyclic heterocyclic amine of the formula

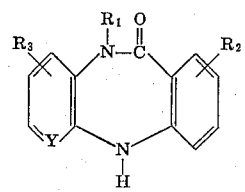

wherein $R_1$, $R_2$, $R_3$ and Y have the same meanings as in formula I, with a haloalkanoyl halide of the formula

wherein A has the same meanings as in formula I and Hal and Hal', which may be identical to or different from each other, are halogen. A compound of the formula II prepared in this manner does not need to be isolated and purified; the raw product may be used as the starting material for a compound of the formula I.

The following examples further illustrate the present invention and will enable others skilled in the art to understand it more completely. It should be understood, however, that the invention is not limited solely to the particular examples given below.

EXAMPLE 1

Preparation of 11-(diallylamino-acetyl)-5,11-dihydro-6H-pyrido[2,3-b][1,4]benzodiazepin-6-one A mixture consisting of 5.8 gm of 11-chloroacetyl-5,11-dihydro-6H-pyrido[2,3-b][1,4]benzodiazepin-6-one, 20 ml of diallylamine and 200 ml of absolute benzene was refluxed for 18 hours. Thereafter, the benzene was distilled off in vacuo, the residue was dissolved in methylene chloride, and the resulting solution was washed with water and evaporated. The residue was recrystallized from isopropanol, yielding 80 percent of theory of 11-(diallylamino-acetyl)-5,11-dihydro-6H-pyrido[2,3-b][1,4]benzodiazepin-6-one, m.p. 165°–167° C, of the formula

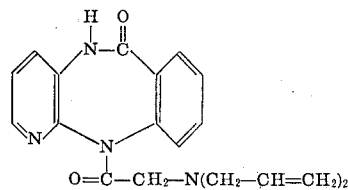

| Analysis: | $C_{20}H_{20}N_4O_2$; | mol. wt. 348.4 | |
|---|---|---|---|
| Caculated: | C - 68.95%; | H - 5.79%; | N - 16.08% |
| Found: | C - 68.80%; | H - 5.79%; | N - 16.24% |

EXAMPLE 2

Using a procedure analogous to that described in Example 1, 11-(diallylamino-acetyl)-5-methyl-5,11-dihydro- 6H-pyrido[2,3-b][1,4]benzodiazepin-6-one, m.p. 103°–105°C (from acetonitrile), of the formula

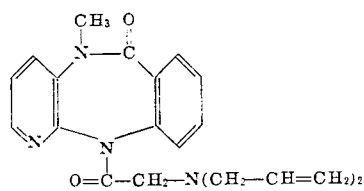

was prepared from 11-chloroacetyl-5-methyl-5,11-dihydro-6H-pyrido[2,3-b][1,4]benzodiazepin-6-one and diallylamine. The yield was 43 percent of theory.

Analysis: $C_{21}H_{22}N_4O_2$;  362.4
Calculated: C - 69.59%;  H - 6.12%;  N - 15.46%
Found: C - 69.60%;  H - 6.14%;  N - 15.46%

The free base was dissolved in isopropanol, the resulting solution was acidified with ethereal hydrochloric acid, and the precipitate formed thereby was collected and recrystallized from acetonitrile/ether, yielding the hydrochloride, m.p. 121°–123°C (decomp.).

Analysis: $C_{21}H_{23}ClN_4O_2$;  mol. wt. 398.9
Calculated: Cl - 8.89%
Found: Cl - 8.75%

EXAMPLE 3

Preparation of 5-ethyl-11-(diallylamino-acetyl)-5,11-dihydro-6H-pyrido[2,3-b][1,4]benzodiazepin-6-one A mixture consisting of 10 gm of 5-ethyl-11-chloroacetyl-5,11-dihydro-6H-pyrido [2,3-b][1,4]benzodiazepin-6-one, 12.6 gm of diallylamine and 100 ml of dioxane was refluxed for 6 hours. Thereafter, the reaction solution was allowed to cool and was then poured into 100 ml of water, and the crystalline precipitate formed thereby was collected by vacuum filtration and recrystallized twice from cyclohexane. 60 percent of theory of 5-ethyl-11-(diallylamino-acetyl)-5,11-dihydro-6H-pyrido[2,3-b][1,4]benzodiazepin-6-one, m.p. 133°–135°C, were obtained.

Analysis: $C_{22}H_{24}N_4O_2$:  mol. wt. 376.5
Calculated: C - 70.19%;  H - 6.43%;  N - 14.88%
Found: C - 70.20%;  H - 6.43%;  N - 14.80%

EXAMPLE 4

Using a procedure analogous to that described in Example 1, 9-chloro-11-(diallylamino-acetyl)-5,11-dihydro-6H-pyrido[2,3-b][1,4]benzodiazepin-6-one, m.p. 163°–164°C (from ethylacetate), of the formula

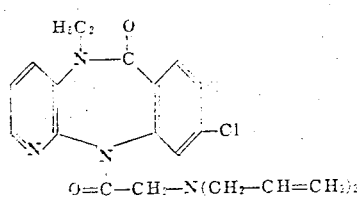

was prepared from 9-chloro-11-chloroacetyl-5,11-dihydro-6H-pyrido[2,3-b][1,4]benzodiazepin-6-one and diallylamine. The yield was 53 percent of theory.

Analysis: $C_{20}H_{19}ClN_4O_2$; mol. wt. 382.9
Calculated: C - 62.74%; H - 5.02%;  N - 14.63%; Cl - 9.26%
Found: C - 62.55%; H - 5.02%;  N - 14.65%; Cl - 9.30%

EXAMPLE 5

11-(3'-Diallylamino-propionyl)-5,11-dihydro-6H-pyido[2,3-b][1,4]benzodiazepin-6-one, m.p. 156°–158°C (from isopropanol/petroleum ether), of the formula

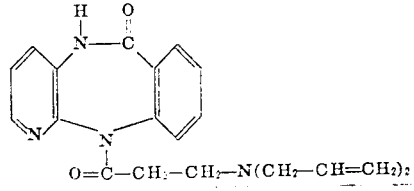

was prepared by refluxing a mixture of 11-(3'-chloropropionyl)-5,11-dihydro-6H-pyrido[2,3-b][1,4]benzodiazepin-6-one (m.p. 216°–218°C, decomp.), diallylamine and dioxane for 3 hours and working up the reaction mixture as described in Example 1. The yield was 62 percent of theory.

Analysis: $C_{21}H_{22}N_4O_2$;  mol. wt. 362.4
Calculated: C - 69.59%;  H - 6.12%;  N - 15.46%
Found: C - 69.60%;  H - 6.21%;  N - 15.60%

EXAMPLE 6

5-Methyl-11-(3'-diallylamino-propionyl)-5,11-dihydro-6H-pyrido[2,3-b][1,4]benzodiazepin-6-one, m.p. 94°–95°C (from cyclohexane/ethylacetate), was prepared by refluxing a mixture of 5-methyl-11-(3'-chloro-propionyl)-5,11-dihydro-6H-pyrido[2,3-b][1,4]benzodiazepin-6-one, diallylamine and isopropanol and working up the reaction mixture as described in Example 1. The yield was 56 percent of theory.

Analysis: $C_{22}N_{24}N_4O_2$;  mol. wt. 376.5
Calculated: C - 70.19%;  H - 6.43%;  N - 14.98%
Found: C - 70.00%;  H - 6.34%;  N - 14.65%

EXAMPLE 7

Using a procedure analogous to that described in Example 5, 11-(2'-diallylamino-propionyl)-5,11-dihydro-6H-pyrido[2,3-b][1,4]benzodiazepin-6-one, m.p. 231°C (decomp.; from isopropanol/ethylacetate), was prepared from 11-(2'-chloro-propionyl)-5,11-dihydro-6H-pyrido[2,3-b][1,4]benzodiazepin-6-one (m.p. 201°–203°C) and diallylamine. The yield was 20 percent of theory.

Analysis: $C_{21}H_{22}N_4O_2$;  mol. wt. 362.4
Calculated: C - 69.59%;  H - 6.12%
Found: C - 69.60%;  H - 5.99%

EXAMPLE 8

Preparation of 5-(diallylamino-acetyl)-5,10-dihydro-11H-dibenzo[b,e][1,4]diazepin-11-one A mixture consisting of 5.8 gm of 5-chloroacetyl-5,10-dihydro-11H-dibenzo[b,e][1,4]diazepin-11-one, 20 ml of diallylamine and 200 ml of absolute benzene was refluxed for 18 hours. Thereafter, the benzene was distilled off in vacuo, the residue was dissolved in methylene chloride, and the resulting solution was washed with water and evaporated. The residue was recrystallized from isopropanol/ether, yielding 63 percent of theory of 5-(diallylamino-acetyl)-5,10-dihydro-11H-dibenzo[b,e][1,4]diazepin-11-one, m. p. 143°–145°C, of the formula

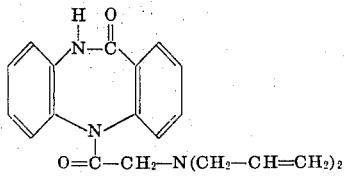

| Analysis: | $C_{21}H_{21}N_3O_2$; | mol. wt. 347.4 | |
|---|---|---|---|
| Calculated: | C - 72.60%; | H - 6.09%; | N - 12.09% |
| Found: | C - 72.40%; | H - 6.21%; | N - 12.01% |

The free base was dissolved in isopropanol, the resulting solution was acidified with isopropanolic fumaric acid, and the precipitate formed thereby was collected and recrystallized from isopropanol, yielding the fumarate, m.p. 131°–133° C (decomp.).

| Analysis: | $2 C_{21}H_{21}N_3O_2 \cdot C_4H_4O_4$; | | mol. wt. 810.9 |
|---|---|---|---|
| Calculated: | C - 68.13%; | H - 5.72%; | N - 10.36% |
| Found: | C - 67.95%; | H - 6.29%; | N - 10.14% |

EXAMPLE 9

Using a procedure analogous to that described in Example 8, 5-(diallylamino-acetyl)-5,10-dihydro-10-methyl11H-dibenzo[b,e][1,4]diazepin-11-one, m. p. 92°–93 C (from petroleum fraction b.p. 100°–140 °C/ethylacetate) of the formula

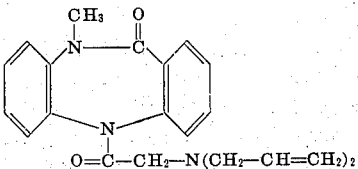

was prepared from 5-chloroacetyl-5,10-dihydro-10-methyl-11H-dibenzo[b,e][1,4]diazepin-11-one and diallylamine. The yield was 55 percent of theory.

| Analysis: | $C_{22}H_{23}N_3O_2$; | mol. wt. 361.4 | |
|---|---|---|---|
| Calculated: | C - 73.11%; | H - 6.41%; | N - 11.63% |
| Found: | C - 73.20%; | H - 6.48%; | N - 11.55% |

EXAMPLE 10

Preparation of 10-ethyl-5-(diallylamino-acetyl)-5,10-dihydro-11H-dibenzo[b,e][1,4]diazepin-11-one and its hydrochloride A mixture consisting of 6.3 gm of 10-ethyl-5-chloroacetyl-5,10-dihydro-11H-dibenzo[b,e][1,4]diazepin-11-one (m.p. 174°–175°C), 25 ml of diallylamine and 200 ml of dioxane was refluxed for 6 hours. Thereafter, the dioxane was distilled off, the residue was dissolved in methylene chloride, and the resulting solution was washed with water and then evaporated. The residue, raw 10-ethyl-5-(diallylaminoacetyl)-5,10-dihydro-11H-dibenzo[b,e][1,4]diazepin-11-one, was dissolved in ethanol, the resulting solution was made weakly acid with dilute aqueous hydrochloric acid, and the acid solution was evaporated in vacuo. The residue was recrystallized from isopropanol/ether, yielding 28 percent of theory of the hydrochloride of 10-ethyl-5-(diallylamino-acetyl)- 5,10-dihydro-11H-dibenzo[b,e][1,4]diazepin-11-one, m.p. 145° C (decomp.).

| Analysis: | $C_{23}H_{26}Cl N_3O_2$; | mol. wt. 411.9 |
|---|---|---|
| Calculated: | N - 10.20%; | Cl - 8.61% |
| Found: | N - 10.17%; | Cl - 8.84% |

EXAMPLE 11

Using a procedure analogous to that described in Example 8, 5-(3'-diallylamino-propionyl-5,10-dihydro-11H-dibenzo[b,e][1,4]diazepin-11-one, m.p. 120°–121° C (from ethylacetate), was prepared from 5-(3'-chloro-propionyl)-5,10-dihydro-11H-dibenzo[b,e][1,4]diazepin-11-one and diallylamine. The yield was 36 percent of theory.

| Analysis: | $C_{22}H_{23}N_3O_2$; | mol. wt. 361.4 | |
|---|---|---|---|
| Calculated: | C - 73.11%; | H - 6.41%; | N - 11.63% |
| Found: | C - 72.90%; | H - 6.49%; | N - 11.78% |

EXAMPLE 12

5-(3'-Diallylamino-propionyl)-5,10-dihydro-10-methyl-11H-dibenzo[b,e][1,4]diazepin-11-one was prepared by refluxing a mixture of 5-(3'-chloro-propionyl)-5,10-dihydro-10-methyl-11H-dibenzo[b,e][1,4]diazepin-11-one (m.p. 181°–182°C; decomp.), diallylamine and isopropanol for 8 hours and working up the reaction mixture as described in Example 10. Its hydrochloride, recrystallized from isopropanol, had a melting point of 212°–214° C (decomp.). The yield was 45 percent of theory.

| Analysis: (hydrochloride | $C_{23}H_{26}Cl N_3O_2$; mol. wt. 411.9 | |
|---|---|---|
| Calculated: | C - 67.06; H - 6.51%; | N - 10.08%; Cl - 8.60% |
| Found: | C - 67.25%; H - 6.56; | N - 10.35%; Cl - 8.55% |

EXAMPLE 13

Preparation of 2-chloro-5-(diallylamino-acetyl)-5,10-dihydro-11H-dibenzo[b,e][1,4]diazepin-11-one its fumarate A mixture consisting of 6.42 gm of 2-chloro-5-chloroacetyl-5,10-dihydro-11H-dibenzo[b,e][1,4]diazepin-11-one, 5.0 gm of diallylamine and 50 ml of dioxane was refluxed for 3 hours. Thereafter, the dioxane was distilled off in vacuo, the residue was taken up in an excess of dilute aqueous ammonia, and the alkaline solution was extracted with chloroform. The chloroform extracts were washed with water, dried with sodium sulfate and evaporated in vacuo, and the residue was recrystallized from aqueous 50 percent isopropanol. 65 percent of theory of 2-chloro-5-(diallylamino-acetyl)-5,10-dihydro-11H-dibenzo[b,e][1,4]diazepin-11-one, m. p. 134°–136° C, of the formula

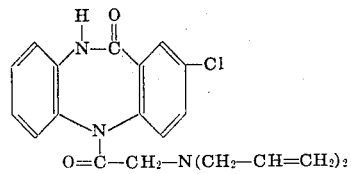

was obtained.

| Analysis: | $C_{21}H_{20}Cl N_3O_2$; mol. wt. 381.9 | |
|---|---|---|
| Calculated: | C - 66.05%; H - 5.28%; | N - 11.01%; Cl - 9.28% |
| Found: | C - 65.95%; H - 5.29%; | N - 11.05%; Cl - 9.25% |

The free base was dissolved in isopropanol, the solution was acidified with an isopropanolic solution of fumaric acid, and the precipitate was recrystallized from isopropanol yielding the fumarate, m.p. 158°–161°C.

Analysis: 2 $C_{21}H_{20}Cl N_3O_2 \cdot C_4H_4O_4$; mol. wt. 879.9
Calculated: C - 62.80%; H - 5.04%; N - 9.55%; Cl - 8.06%
Found: C - 62.50%; H - 5.44%; N - 9.40%; Cl - 7.75%

EXAMPLE 14

Using a procedure analogous to that described in Example 13, 2-chloro-5-(diallylamino-acetyl)-5,10-dihydro- 10-methyl-11H-dibenzo[b,e][1,4]diazepin-11-one, m.p. 101°–103° C (from aqueous 50 percent ethanol), was prepared from 2-chloro-5-chloroacetyl-5,10-dihydro-10-methyl-11H-dibenzo[b,e][1,4]diazepin-11-one and diallylamine. The yield was 64 percent of theory.

Analysis: $C_{22}H_{22}Cl N_3O_2$; mol. wt. 395.9
Calculated: C - 66.75%; H - 5.60%; N - 10.61%; Cl - 8.96%
Found: C - 66.55%; H - 5.64%; N - 10.57%; Cl - 8.84%

EXAMPLE 15

Using a procedure analogous to that described in Example 13, raw 2-chloro-5-(3'-diallylamino-propionyl)-5,10-dihydro-11H-dibenzo[b,e][1,4]diazepin-11-one was prepared from 2-chloro-5-(3'-chloro-propionyl)-5,10-dihydro-11H-dibenzo[b,e][1,4]diazepin-11-one (m.p. 169°–171°C) and diallylamine.

The raw base was dissolved in ethanol, the resulting solution was acidified with ethereal hydrochloric acid, and the crystalline precipitate was recrystallized from ethanol which contained a small amount of hydrochloric acid, yielding 43 percent of theory of the hydrochloride, m.p. 155°–158°C.

Analysis: $C_{22}H_{23}Cl_2N_3O_2$; mol. wt. 432.4
Calculated: C - 61.11%; H - 5.37%; N - 9.72%; Cl - 16.40%
Found: C - 61.20%; H - 5.35%; N - 9.52%; Cl - 16.10%

EXAMPLE 16

Using a procedure analogous to that described in Example 15, 2-chloro-5-(3'-diallylamino-propionyl)-5,10-dihydro-10-methyl-11H-dibenzo[b,e][1,4]diazepin-11-one hydrochloride, m.p. 208°–210°C (from isopropanol), was prepared from 2-chloro-5-(3'-chloro-propionyl)-5,10-dihydro-10-methyl-11H-dibenzo[b,e][1,4]diazepin-11-one (m.p. 140°–142°C) and diallylamine. The yield was 72 percent of theory.

Analysis: $C_{23}H_{25}Cl_2N_3O_2$; mol. wt. 446.4
Calculated: C - 61.88%; H - 5.65%; N - 9.41%; Cl - 15.89%
Found: C - 61.70%; H - 5.75%; N - 9.16%; Cl - 15.60%

EXAMPLE 17

Preparation of 8-chloro-5-(diallylamino-acetyl)-5,10-dihydro-11H-dibenzo[b,e][1,4]diazepin-11-one A mixture consisting of 4.5 gm of 8-chloro-5-chloroacetyl-5,10-dihydro-11H-dibenzo[b,e][1,4]diazepin-11-one, 5.0 gm of diallylamine and 100 ml of isopropanol was distilled off in vacuo, the residue was admixed with an excess of dilute hydrochloric acid and activated charcoal, and the mixture was filtered while hot. The filtrate was made alkaline with ammonia and extracted with chloroform. The chloroform extracts were washed with water, dried over sodium sulfate and evaporated. The residue was recrystallized from isopropanol, yielding 48 percent of theory of 8-chloro-5-(diallylamino-acetyl)-5,10-dihydro-11H-dibenzo[b,e][1,4]diazepin-11-one, m.p. 143°–145°C, of the formula

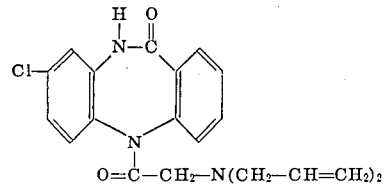

Analysis: $C_{21}H_{20}Cl N_3O_2$; mol. wt. 381.9
Calculated: C - 66.05%; H - 5.28%; N - 11.01%; Cl - 9.28%
Found: C - 65.80%; H - 5.34 %; N - 10.90%; Cl - 9.03%

EXAMPLE 18

Preparation of 2-chloro-5-(2'-diallylamino-propionyl)-5,10-dihydro-11H-dibenzo[b,e][1,4]diazepin-11-one A mixture consisting of 1.2 gm of 2-chloro-5-(2'-chloro-propionyl)-5,10-dihydro-11H-dibenzo[b,e][1,4]diazepin-11-one and 19.4 gm of diallylamine was heated at 175°C in an autoclave for 7 hours. Thereafter, the excess, unreacted diallylamine was distilled off, the residue was admixed with dilute hydrochloric acid and warmed, activated charcoal was added, and the mixture was filtered. The filtrate was made alkaline with ammonia and extracted with chloroform. The chloroform extracts were washed with water, dried with sodium sulfate and evaporated. The residue was recrystallized from ethanol, yielding 28 percent of theory of 2-chloro-5-(2'-diallylamino-propionyl)-5,10-dihydro-11H-dibenzo[b,e][1,4]diazepin-11-one, m.p. 187°–189° C, of the formula

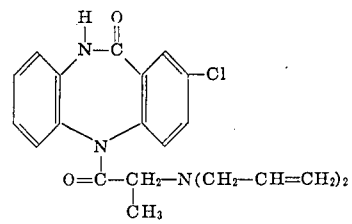

Analysis: $C_{22}H_{22}Cl N_3O_2$; mol. wt. 395.9
Calculated: C - 66.75%; H - 5.60%; N - 10.61%; Cl - 8.96%
Found: C - 66.50%; H - 5.79%; N - 10.58%; Cl - 8.89%

EXAMPLE 19

5-(2'-Diallylamino-propionyl)-5,10-dihydro-10-methyl-11H-dibenzo[b,e][1,4]diazepin-11-one, m.p. 155°–156° C (from ethylacetate), was prepared by refluxing a mixture of 5-(2'-chloro-propionyl)-5,10-dihydro-10-methyl-11H-dibenzo[b,e][1,4]diazepin-11-one, diallylamine and diethyleneglycol dimethylether for 15 hours and working up the reaction mixture, as described in Example 18. The yield was 25 percent of theory.

Analysis: $C_{23}H_{25}N_3O_2$; mol. wt. 375.5
Calculated: C - 73.58%; H - 6.71%; N - 11.19%
Found: C - 73.70%; H - 6.92%; N - 11.45%

EXAMPLE 20

Using a procedure analogous to that described in Example 17, 3-chloro-5-(diallylamino-acetyl)-5,10-dihydro-11H-dibenzo[b,e][1,4]diazepin-11-one, m.p. 160°–161° C (from aqueous methanol), was prepared from 3-chloro-5-chloroacetyl-5,10-dihydro-11H-dibenzo[b,e][1,4]diazepin-11-one and diallylamine in isopropanol. The yield was 50 percent of theory.

Analysis: $C_{21}H_{20}Cl\ N_3O_2$; mol. wt. 381.9
Calculated: C - 66.05%; H - 5.28%; N - 11.01%; Cl - 9.28%
Found: C - 65.80%; H - 5.48%; N - 10.90%; Cl - 9.32%

The compounds according to the present invention, that is, those embraced by formula I above and their non-toxic, pharmacologically acceptable acid addition salts, have useful pharmacodynamic properties. More particularly, the compounds of the invention exhibit very effective stomach ulcer-inhibiting and stomach juice secretion-inhibiting activities in warm-blooded animals, such as rats. Particularly effective in these respects are the following compounds:

- 5-(Diallylamino-acetyl)-5,10-dihydro-11H-dibenzo[b,e][1,4]diazepin-11-one;
- 2-Chloro-5-(3'-diallylamino-propionyl)-5,10-dihydro-11H-dibenzo[b,e][1,4]diazepin-11-one;
- 2-Chloro-5-(3'-diallylamino-propionyl)-5,10-dihydro-10-methyl-11H-dibenzo[b,e][1,4]diazepin-11-one;
- 5-(Diallylamino-acetyl)-5,10-dihydro-10-methyl-11H-dibenzo[b,e][1,4]diazepin-11-one;
- 5-(3'-Diallylamino-propionyl)-5,10-dihydro-11H-dibenzo-[b,e][1,4]diazepin-11-one;
- 11-(3'-Diallylamino-propionyl)-5,11-dihydro-5-methyl-6H-pyrido[2,3-b][1,4]benzodiazepin-6-one;
- 5-(3'-Diallylamino-propionyl)-5,10-dihydro-10-methyl-11H-dibenzo[b,e][1,4]diazepin-11-one;
- 11-(3'-Diallylamino-propionyl)-5,11-dihydro-6H-pyrido0[2,3-b][1,4]benzodiazepin-6-one;
- 11-(Diallylamino-acetyl)-5,11-dihydro-6H-pyrido[2,3-b]-[1,4]benzodiazepin-6-one;
- 2-Chloro-5-(diallylamino-acetyl)-5,10-dihydro-11H-dibenzo[b,e][1,4]diazepin-11-one;

and their non-toxic, pharmacologically acceptable acid addition salts.

The inhibiting action of the compounds according to the present invention upon the formation of stress-ulcers in the stomach was ascertained in laboratory rats by means of the standard test method of K. Takagi and S. Okabe, Japanese J. Pharmac. 18, 9–18 (1968).

The inhibiting action of the compounds according to the instant invention upon the rate of secretion of stomach juice and the amount of secreted total hydrochloric acid was ascertained in laboratory rats by means of the standard test method of Shay et al., Gastroenterology 5, 43–61 (1945).

The acute peroral toxicity ($LD_{50}$ p.o.) of the compounds of the invention was ascertained by standard methods in white laboratory mice, and was found to be greater than 1,500 mgm/kg. in most cases.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective peroral dosage unit of the compounds according to the present invention is from 0.083 to 0.5 mgm/kg body weight, preferably 0.166 to 0.34 mgm/kg body weight. The effective peroral daily dose rate is from 0.33 to 1.67 mgm/kg body weight, preferably 0.5 to 1.0 mgm/kg body weight.

The following examples illustrate a few dosage unit compositions comprising a compound of the instant invention as an active ingredient and represent the best mode contemplated of putting the invention to practical use. The parts are parts by weight unless otherwise specified

EXAMPLE 21

Tablets

The tablet composition was compounded from the following ingredients:

| | |
|---|---|
| 11-(diallylamino-acetyl)-5,11-dihydro-6H-pyrido[2,3-b][1,4]benzodiazepin-6-one hydrochloride | 10.0 parts |
| Lactose | 148.0 parts |
| Potato starch | 60.0 parts |
| Magnesium stearate | 2.0 parts |
| Total | 220.0 parts |

Compounding procedure:

An aqueous 10 parts slurry was prepared with a portion of the potato starch by heating. The pyridobenzodiazepinone compound, the lactose and the remainder of the potato starch were intimately admixed with each other, and the mixture was granulated by moistening it with the slurry and forcing it through a 1.5 mm-mesh screen. The granulate was dried at 45°C, again passed through the screen and admixed with the magnesium stearate, and the mixture was compressed into 20 mgm-tablets. Each tablet contained 10.0 mgm of the pyridobenzodiazepinone compound and, when administered perorally to a warm-blooded animal of about 60 kg body weight in need of such treatment, produced very good stomach ulcer inhibiting and stomach juice secretion inhibiting effects.

EXAMPLE 22

Coated Tablets

The tablets prepared pursuant to Example 21 were coated in conventional manner with a thin shell consisting essentially of talcum and sugar, and the coated tablets were polished with beeswax. The coated tablets produced the same therapeutic effect as the uncoated tablets of the preceding example.

EXAMPLE 23

Hypodermic Solution

The solution was compounded from the following ingredients:

| | | |
|---|---|---|
| 5-(Diallylamino-acetyl)-5,10-dihydro-11H-dibenzo[b,e][1,4]diazepin-11-one hydrochloride | | 2.0 parts |
| Sodium chloride | | 8.0 parts |
| Distilled water | q.s.ad | 1000.0 parts by vol. |

Compounding procedure:

The dibenzodiazepinone compound and the sodium chloride were dissolved in a sufficient amount of distilled water, the solution was diluted to the indicated volume with additional distilled water and then filtered until free from suspended particles, and the filtrate was filled into 1 cc-ampules which were then sealed and sterilized for 20 minutes at 120°C. Each ampule contained 2 mgm of the dibenzodiazepinone compound, and when the contents thereof were administered intraduodenally or intraperitoneally to a warm-blooded animal of about 60 kg body weight in need of such treatment, very good stomach ulcer inhibiting and stomach juice secretion inhibiting effects were obtained.

EXAMPLE 24

Suppositories

The suppository composition was compounded from the following ingredients:

| | |
|---|---|
| 5,11-Dihydro-11-(diallylamino-acetyl)-6H-pyrido[2,3-b][1,4]benzodiazepin-6-one hydrochloride | 15.0 parts |
| Cocoa butter | 1685.0 parts |
| Total | 1700.0 parts |

Compounding procedure:

The finely pulverized pyridobenzodiazepinone compound was suspended with the aid of an immersion homogenizer in the cocoa butter which had been melted and cooled to 40°C. 1,700 mgm-portions of the homogeneous mixture were then poured into cooled suppository molds. Each suppository contained 15 mgm of the pyridobenzodiazepinone compound and, when administered by the rectal route to a warm-blooded animal of about 60 kg body weight in need of such treatment, produced very good stomach ulcer inhibiting and stomach juice secretion inhibiting effects.

EXAMPLE 25

Drop Solution

The solution was compounded from the following ingredients:

| | |
|---|---|
| 5,11-Dihydro-11-(diallylamino-acetyl)-6H-pyrido[2,3-b][1,4]benzodiazepin-6-one hydrochloride | 1.0 part |
| Methyl p-hydroxy-benzoate | 0.035 part |
| Propyl p-hydroxy-benzoate | 0.015 part |
| Anise oil | 0.05 part |
| Menthol | 0.06 part |
| Ethanol, pure | 10.00 part |
| Sodium cyclamate | 1.00 part |
| Glycerin | 15.00 part |
| Distilled water  q.s.ad | 100.00 part by vol. |

Compounding procedure:

The pyridobenzodiazepinone compound and the sodium cyclamate were dissolved in about 70 parts by volume of distilled water, and the glycerin was added to the solution. The p-hydroxy-benzoates, the oil of anise and the menthol were dissolved in the ethanol, and the resulting solution was stirred into the aqueous solution. Finally, the mixed solution was diluted to the indicated volume with distilled water and then filtered until free from suspended matter. 1 cc (20 drops) of the filtrate contained 10 mgm of the pyridobenzodiazepinone compound and, when administered perorally to a warm-blooded animal of about 60 kg body weight in need of such treatment, produced very good stomach ulcer inhibiting and stomach juice secretion inhibiting effects.

A pharmaceutical dosage unit composition comprising a compound of the present invention as an active ingredient may, in addition, also contain one effective dosage unit of one or more other active ingredients having different pharmacodynamic properties, such as sedatives, tranquilizers, local anesthetics, astringents, antacids or the like, as illustrated by the following examples.

EXAMPLE 26

Coated Pills

The pill core composition was compounded from the following ingredients:

| | |
|---|---|
| 5,11-Dihydro-11-(diallylamino-acetyl)-6H-pyrido[2,3-b][1,4]benzodiazepin-6-one hydrochloride | 10.0 parts |
| Phenyl-ethyl-barbituric acid | 25.0 parts |
| Lactose | 50.0 parts |
| Corn starch | 30.0 parts |
| Polyvinylpyrrolidone | 4.0 parts |
| Magnesium stearate | 1.0 parts |
| Total | 120.0 parts |

Compounding procedure:

The pyridobenzodiapinone compound, the barbituric acid compound, the lactose and the corn starch were intimately admixed with each other, the mixture was granulated by moistening it with an ethanolic 10 percent solution of the polyvinylpyrrolidone and forcing the moist mass through a 1.5 mm-mesh screen, the granulate was dried at 45° C and again passed through a 1 mm-mesh screen, the dry granulate was admixed with the magnesium stearate, and the mixture was compressed into 120 mgm-pill cores which were then coated with a thin shell consisting essentially of talcum and sugar. The coated pills were finally polished with beeswax. Each coated pill contained 10.0 mgm of the pyridobenzodiazepinone compound and 25.0 mgm of the barbituric acid compound and, when administered perorally to a warm-blooded animal of about 60 kg body weight in need of such treatment, produced very good stomach ulcer inhibiting, stomach juice secretion inhibiting and sedative effects.

EXAMPLE 27

Coated Pills

The pill core composition was compounded from the following ingredients:

| | |
|---|---|
| 5,11-Dihydro-11-(diallylamino-acetyl)-6H-pyrido[2,3-b][1,4]benzodiazepin-6-one hydrochloride | 10.0 parts |
| 2-Diethylamino-2',6'-acetoxylidide | 50.0 parts |
| Lactose | 98.0 parts |
| Corn starch | 50.0 parts |
| Polyvinylpyrrolidone | 10.0 parts |
| Magnesium stearate | 2.0 parts |
| Total | 220.0 parts |

Compounding procedure:

The pyridobenzodiazepionone compound, the acetoxylidide compound, the lactose and the corn starch were intimately admixed with each other, the mixture was granulated by moistening it with an ethanolic 20 percent solution of the polyvinylpyrrolidone and forcing the moist mass through a 1.5 mm-mesh screen, the granulate was dried at 45°C and again passed through the screen, the dry granulate was admixed with the magnesium stearate, and the mixture was compressed into 220 mgm-pill cores which were then coated with a thin shell consisting of talcum and sugar. The coated pills were finally polished with beeswax. Each coated pill contained 10.0 mgm of the pyridobenzdiazepinone compound and 50.0 mgm of the acetoxylidide compound and, when administered perorally to a warm-blooded animal of about 60 kg body weight in need of such treatment, produced very good stomach ulcer inhibiting, stomach juice secretion inhibiting and local anesthetic effects.

EXAMPLE 28

Soluble Powder

The powder was compounded from the following ingredients:

| | |
|---|---:|
| 5,11-Dihydro-11-(diallylamino-acetyl)-6H-pyrido[2,3-b][1,4]benzodiazepin-6 one hydrochloride | 10.0 parts |
| Diacetyltannin albumin with 6% silver | 300.0 parts |
| Total | 310.0 parts |

Compounding procedure:

The two ingredients were intimately admixed with each other, and 310 mgm-portions of the mixture were filled into aluminum foil packages which were then sealed. Each package contained 10 mgm of the pyridobenzodiazepinone compound and 300 mgm of the diacetyltannin compound, and when the contents thereof were dissolved in water and the solution was administered perorally to a warm-blooded animal of about 60 kg body weight in need of such treatment, very good stomach ulcer inhibiting, stomach juice secretion inhibiting and astringent effects were produced.

EXAMPLE 29

Chewable Tablet

The tablet composition was compounded from the following ingredients:

| | |
|---|---:|
| 5,11-Dihydro-11-(diallylamino-acetyl)-6H-pyrido[2,3-b][1,4]benzodiazepin-6-one hydrochloride | 10.0 parts |
| Dimagnesium aluminum trisilicate | 500.0 parts |
| Skimmed milk powder | 300.0 parts |
| Mannitol | 113.0 parts |
| Vanillin, milled | 1.0 parts |
| Cocoa butter | 70.0 parts |
| Sodium cyclamate, milled | 1.0 parts |
| Magnesium stearate | 5.0 parts |
| Total | 1000.0 parts |

Compounding procedure:

The pyridobenzodiazepinone compound, the dimagnesium aluminum trisilicate, the skimmed milk powder and the mannitol were thoroughly admixed with each other, and the mixture was moistened first with an ethanolic 30 percent solution of the cocoa butter and then with 0.5 parts of distilled water. The moist mass was forced through a 2.0 mm-mesh screen, the resulting moist granulate was dried at 45°C, and the dry granulate was passed through a 1.5 mm-mesh screen and then intimately admixed with the remaining ingredients. The mixture was compressed into 1,000 mgm-tablets. Each chewable tablet contained 10 mgm of the pyridobenzodiazepinone compound and 500 mgm of the dimagnesium aluminum trisilicate and, when administered perorally to a warm-blooded animal of about 60 kg body weight in need of such treatment, produced very good stomach ulcer inhibiting, stomach juice secretion inhibiting and antacid effects.

EXAMPLE 30

Tablets:

The tablet composition was compounded from the following ingredients:

| | |
|---|---:|
| 11-(diallylamino-acetyl)-5,11-dihydro-6H-pyrido[2,3-b][1,4]benzodiazepin-6-one hydrochloride | 10.0 parts |
| 7-Chloro-1,3-dihydro-3-hydroxy-5-phenyl-2H-1,4-benzodiazepin-2-one | 5.0 parts |
| Lactose | 135.0 parts |
| Potato starch | 60.0 parts |
| Polyvinylpyrrolidone | 8.0 parts |
| Magnesium stearate | 2.0 parts |

Compounding procedure:

The pyridobenzodiazepinone compound, the benzodiazepinone compound, the lactose and the potato starch were intimately admixed with each other, the mixture was moistened with an ethanolic 15 percent solution of the polyvinylpyrrolidone, the moist mass was granulated by forcing it through a 1.5 mm-mesh screen, and the moist granulate was dried at 45°C and again passed through the screen. The dry granulate was admixed with the magnesium stearate, and the composition was compressed into 220 mgm-tablets. Each tablet contained 10 mgm of the pyridobenzodiazepinone compound and 5 mgm of the benzodiazepinone compound and, when administered perorally to a warm-blooded animal of about 60 kg body weight in need of such treatment, produced very good stomach ulcer inhibiting, stomach juice secretion inhibiting and tranquilizing effects.

Analogous results were obtained when an equal amount of any one of the other compounds embraced by formula I above or a non-toxic acid addition salt thereof was substituted for the particular pyridobenzodiazepinone compound in Examples 21 to 30. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

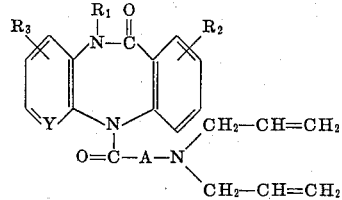

wherein $R_1$ is hydrogen or alkyl of one to four carbon atoms, $R_2$ and $R_3$ are each hydrogen or halogen,
Y is nitrogen or —CH—, and
A is alkylene of one to two carbon atoms,
or a non-toxic, pharmacologically acceptable acid addition salt thereof.

2. A compound of the formula

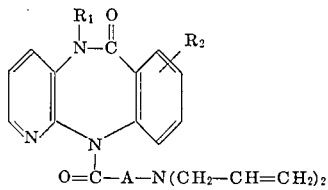

wherein
$R_1$ is hydrogen, methyl or ethyl,
$R_2$ is hydrogen or chlorine, and
A is alkylene of one to two carbon atoms,
or a non-toxic, pharmacologically acceptable acid addition salt thereof.

3. A compound of the formula

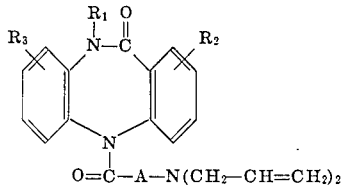

wherein
$R_1$ is hydrogen, methyl or ethyl,
$R_2$ and $R_3$ are each hydrogen or chlorine, but other than both chlorine at the same time, and
A is alkylene of one to two carbon atoms,
or a non-toxic, pharmacologically acceptable acid addition salt thereof.

4. A compound according to claim 2, which is 11-(diallylamino-acetyl)-5,11-dihydro-6H-pyrido[2,3-b][1,4]-benzodiazepin-6-one or a non-toxic, pharmacologically acceptable acid addition salt thereof.

5. A compound according to claim 2, which is 11-(diallylamino-acetyl)-5-methyl-5,11-dihydro-6H-pyrido[2,3-b][1,4]benzodiazepin-6-one or a non-toxic, pharmacologically acceptable acid addition salt thereof.

6. A compound according to claim 2, which is 11-(3'-diallylamino-propionyl)-5,11-dihydro-6H-pyrido[2,3-b][1,4]benzodiazepin-6-one or a non-toxic, pharmacologically acceptable acid addition salt thereof.

7. A compound according to claim 2, which is 11-(3'-diallylamino-propionyl)-5-methyl-5,11-dihydro-6H-pyrido-[2,3-b][1,4]benzodiazepin-6-one or a non-toxic, pharmacologically acceptable acid addition salt thereof.

8. A compound according to claim 3, which is 5-(diallylamino-acetyl)-5,10-dihydro-11H-dibenzo[b,e][1,4]diazepin-11-one or a non-toxic, pharmacologically acceptable acid addition salt thereof.

9. A compound according to claim 3, which is 5-(diallylamino-acetyl)-5,10-dihydro-10-methyl-11H-dibenzo[b,e][1,4]diazepin-11-one or a non-toxic, pharmacologically acceptable acid addition salt thereof.

10. A compound according to claim 3, which is 5-(3'-diallylamino-propionyl)-5,10-dihydro-11H-dibenzo[b,e][1,4]diazepin-11-one or a non-toxic, pharmacologically acceptable acid addition salt thereof.

11. A compound according to claim 3, which is 2-chloro-5-(3'-diallylamino propionyl)-5,10-dihydro-11H-dibenzo[b,e][1,4]diazepin-11-one or a non-toxic, pharmacologically acceptable acid addition salt thereof.

12. A compound according to claim 3, which is 2-chloro-5-(3'-diallylamino-propionyl)-5,10-dihydro-10-methyl-11H-dibenzo[b,e][1,4]diazepin-11-one or a non-toxic, pharmacologically acceptable acid addition salt thereof.

* * * * *